(12) United States Patent
King et al.

(10) Patent No.: US 7,770,052 B2
(45) Date of Patent: Aug. 3, 2010

(54) COLLABORATIVE WEB-BASED AIRPLANE LEVEL FAILURE EFFECTS ANALYSIS TOOL

(75) Inventors: Kevin N. King, Mill Creek, WA (US); Anapathur V. Ramesh, Bothell, WA (US); Larry R. Schultz, Bellevue, WA (US); Tilak C. Sharma, Kent, WA (US); David W. Twigg, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 11/436,330

(22) Filed: May 18, 2006

(65) Prior Publication Data
US 2007/0294594 A1 Dec. 20, 2007

(51) Int. Cl.
*G06F 11/00* (2006.01)
*G06F 11/30* (2006.01)

(52) U.S. Cl. .................. 714/2; 702/183; 702/185; 703/17; 703/27; 715/714; 715/751

(58) Field of Classification Search ............... 714/26, 714/57, 32, 33, 41, 2; 703/17, 16, 27; 715/714, 715/751; 702/183, 185
See application file for complete search history.

(56) References Cited

U.S. PATENT DOCUMENTS

| | | | |
|---|---|---|---|
| 5,014,220 A | 5/1991 | McMann et al. | |
| 5,067,099 A * | 11/1991 | McCown et al. | 702/183 |
| 5,127,005 A * | 6/1992 | Oda et al. | 714/26 |
| 5,161,158 A * | 11/1992 | Chakravarty et al. | 714/26 |
| 5,253,184 A * | 10/1993 | Kleinschnitz | 702/184 |
| 5,596,712 A * | 1/1997 | Tsuyama et al. | 714/26 |
| 6,324,665 B1 * | 11/2001 | Fay | 714/736 |
| 6,704,541 B1 * | 3/2004 | Ciarallo et al. | 434/362 |
| 6,909,994 B2 * | 6/2005 | Johnson et al. | 702/185 |
| 7,013,411 B2 * | 3/2006 | Kallela et al. | 714/47 |
| 7,017,080 B1 | 3/2006 | Liggesmeyer et al. | |
| 7,120,819 B1 * | 10/2006 | Gurer et al. | 714/4 |
| 7,203,881 B1 * | 4/2007 | Williams et al. | 714/741 |
| 7,239,979 B1 * | 7/2007 | McComber et al. | 702/185 |

(Continued)

FOREIGN PATENT DOCUMENTS

EP    1544771 A1    6/2005

OTHER PUBLICATIONS

Wikipedia's Relational Database version from May 13, 2006 http://en.wikipedia.org/w/index.php?title=Relational_database&oldid=52943993.*

(Continued)

*Primary Examiner*—Scott T Baderman
*Assistant Examiner*—Joseph Schell
(74) *Attorney, Agent, or Firm*—Yee & Associates, P.C.; Diana M. Tsuda (57) ABSTRACT

Analyzing system malfunction data and associated direct and indirect effects in a collaborative tool to determine relationships between the effects and the system malfunction information. System malfunction cases and other data are received and stored. A user may view and/or modify the system malfunction data. The data may be presented in a relational structure. Each system malfunction case is linked to one or more direct effects, and each direct effect is linked to one or more indirect effects.

24 Claims, 5 Drawing Sheets

U.S. PATENT DOCUMENTS

| | | | |
|---|---|---|---|
| 7,249,283 B2* | 7/2007 | Platteter | 714/25 |
| 7,334,222 B2* | 2/2008 | Keller | 717/135 |
| 7,383,155 B2* | 6/2008 | Rosam et al. | 702/182 |
| 2002/0112064 A1* | 8/2002 | Eastvold | 709/230 |
| 2003/0033093 A1* | 2/2003 | Nelson | 702/34 |
| 2003/0070108 A1* | 4/2003 | Groen et al. | 714/1 |
| 2003/0135786 A1* | 7/2003 | Vollmar et al. | 714/25 |
| 2004/0044499 A1 | 3/2004 | House et al. | |
| 2005/0065667 A1* | 3/2005 | Weineck | 701/3 |
| 2005/0246590 A1* | 11/2005 | Lancaster | 714/47 |

OTHER PUBLICATIONS

Wikipedia's Prototyping, version from Apr. 7, 2005 found via the WayBack Machine http://web.archive.org/web/*/http://en.wikipedia.org/wiki/Prototyping http://web.archive.org/web/20050407085820/http://en.wikipedia.org/wiki/Prototyping.*

Model-based development and the implications to design assurance and certification by Bhatt, Hall, Dajani-Brown and Paulitsch Digital Avionics Systems Conference, 2005. DASC 2005. The 24th, Nov. 3, 2005 ISBN: 0-7803-9307-4.*

"Xfmea Failure Mode and Effects Analysis Software" ReliaSoft, retrieved Feb. 12, 2009, pp. 1-2 http://www.reliasoft.com/xfmea/.

Picardi et al., "AUTAS: a tool for supporting FMECA generation in aeronautic systems", Aug. 2004.

Hong Xu et al., "Combining dynamic fault trees and event trees for probabilistic risk assessment", Reliability and Manitainability annual symposium, 2004, Los Angeles, CA, IEEE, pp. 214-219.

Westfall, "Cause & Effect Diagrams", Thomas Pyzdek, The Siix Sigma Handbook, McGraw-Hill 2001, retrieved Feb. 26, 2010 http://www.westfallteam.com/papers/cause&effect_Diagrams.pdf.

Huang et al., "Failure Mode and Effect Analysis (FMEA) Over the WWW", The International Journal of Advanced Manufacturing Technology, vol. 16, No. 8, Jul. 2000,London, UK, pp. 603-608.

EP Search Report for application EP027251890 dated Mar. 10, 2010.

* cited by examiner

COLLABORATIVE WEB-BASED AIRPLANE LEVEL FAILURE EFFECTS ANALYSIS TOOL

FIELD OF THE INVENTION

The present invention relates to the field of data processing, in particular, to methods and apparatuses for receiving and storing system malfunction effects data, and for facilitating a user in viewing and/or modifying the data.

BACKGROUND OF THE INVENTION

Advances in airplane design have led to the development of numerous mutually dependent systems. Failures or malfunctions of one or more of these systems often affect other systems, directly or indirectly. Additionally, analysis of these failures/malfunctions and their direct and indirect effects is often required as part of a certification process. Typically such analyses are manually performed by groups of system analysts, without reference to a system or process capable of facilitating such analyses.

Additionally, advances in networks and computer systems have increasingly facilitated computer system users in collaborating with other users in the creation and modification of a shared block of data. Examples abound, including online "bulletin boards," which allow multiple users in different locations connected by the Internet or some other network to collaborate in creating and modifying data of the "bulletin board."

While recent advances have allowed groups of system analysts to collaborate through a tool similar to an online bulletin board, no system or process has presented the malfunction and failure effects data in a relational fashion, for example, with each malfunction/failure linked to one or more direct effects, and each direct effect linked to one or more indirect effects, facilitating users in defining malfunctions/failures and direct and indirect effects, and in viewing and/or modifying the malfunctions/failures and effects.

BRIEF DESCRIPTION OF THE DRAWINGS

The present invention will be described by way of exemplary embodiments, but not limitations, illustrated in the accompanying drawings in which like references denote similar elements, and in which.

SUMMARY

Illustrative embodiments of the present invention include, but are not limited to, methods and apparatuses for receiving system malfunction effects data including at least one malfunction and a plurality of direct and indirect effects associated with each of the at least one malfunction, and storing the received system malfunction effects data. The illustrative embodiments may also facilitate a user in viewing and/or modifying the system malfunction effects data, and the viewing includes presenting the data in a relational fashion, with each malfunction linked to one or more direct effects, and each direct effect linked to one or more indirect effects. The features, functions, and advantages of the illustrative embodiments can be achieved independently in various embodiments of the present invention or may be combined in yet other embodiments.

DETAILED DESCRIPTION OF EMBODIMENTS OF THE INVENTION

Various aspects of illustrative embodiments of the present invention will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
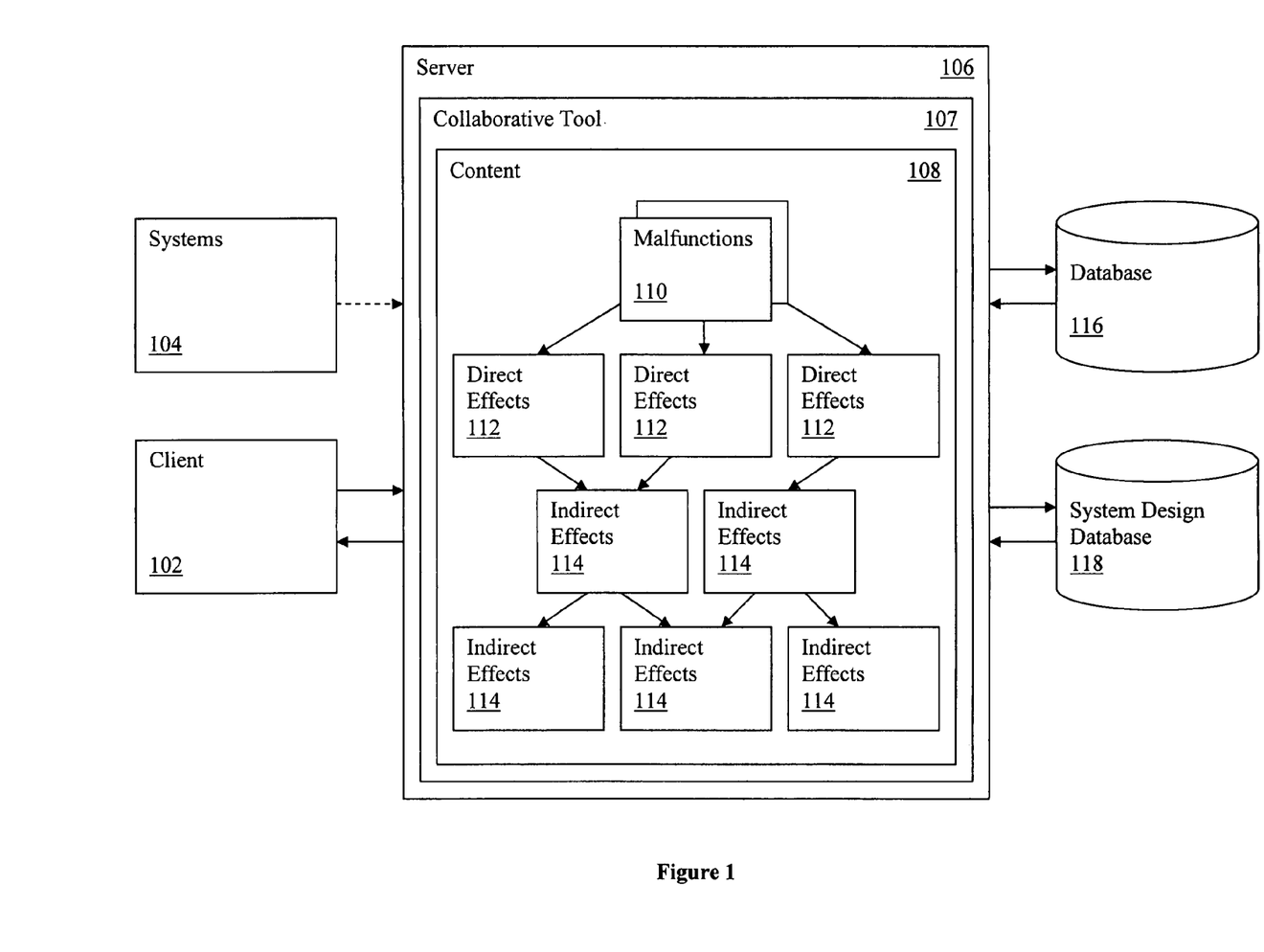
FIG. 1 illustrates an overview of the present invention, in accordance with various embodiments.

FIG. 1 illustrates an overview of the present invention, in accordance with various embodiments. As illustrated, for the embodiments, a client 102 may be connected to a server 106. The server 106 may receive malfunction and failure cases 110, and direct and indirect effects 112/114 of such cases from the client 102, and in some embodiments, may receive malfunctions/failures 110 and effects 112/114 automatically from an affected system 104, and may determine the relationships between the malfunctions/failures 110 and effect 112/114 received from the systems by reference to a system design database 118. A collaborative tool 107 of server 106 may then store the received system malfunction effects data (content 108) in a database, such as database 116. The tool 107 may also facilitate a user of client 102 in viewing and/or modifying the content 108, and may present the malfunctions 110 and effects 112/114 to a user through client 102 in a relational fashion, with each malfunction 110 linked to one or more direct effects 112, and each direct effect 112 linked to one or more indirect effects 114.

In various embodiments, client 102 may be a computer system having a web browser, such as Internet Explorer, Netscape, or Mozilla. The client may facilitate a user in interacting with a web application provided by a remote server, such as the collaborative tool 107 of server 106. In alternate embodiments, the client 102 may include a web-application specific agent, only facilitating a user in interacting with collaborative tool 107. In either case, the generic browser or web application specific agent may be a process of a computer system. In yet other embodiments, client 102 may be a system simulation program of the computer system capable of interacting with collaborative tool 107. The computer system may be of any sort known in the art, such as a PC, a workstation, a server, a PDA, or a mobile device. The computer system of client 102 may be connected to server 106 via a networking fabric (not shown). The networking fabric may include local and/or wide area networking, wired and/or wireless, and may utilize any communication protocol known in the art, such as TCP/IP or ATM.

As shown, system 104 may be any sort of electrical and/or mechanical system, such as an airplane, or systems/subsystems disposed thereon, that may malfunction or be affected by a malfunction 110. In some embodiments, a system 104 may be equipped with a sensor or embedded system capable of automatically transmitting a signal to server 106 indicating a malfunction 110.

Figure 5:
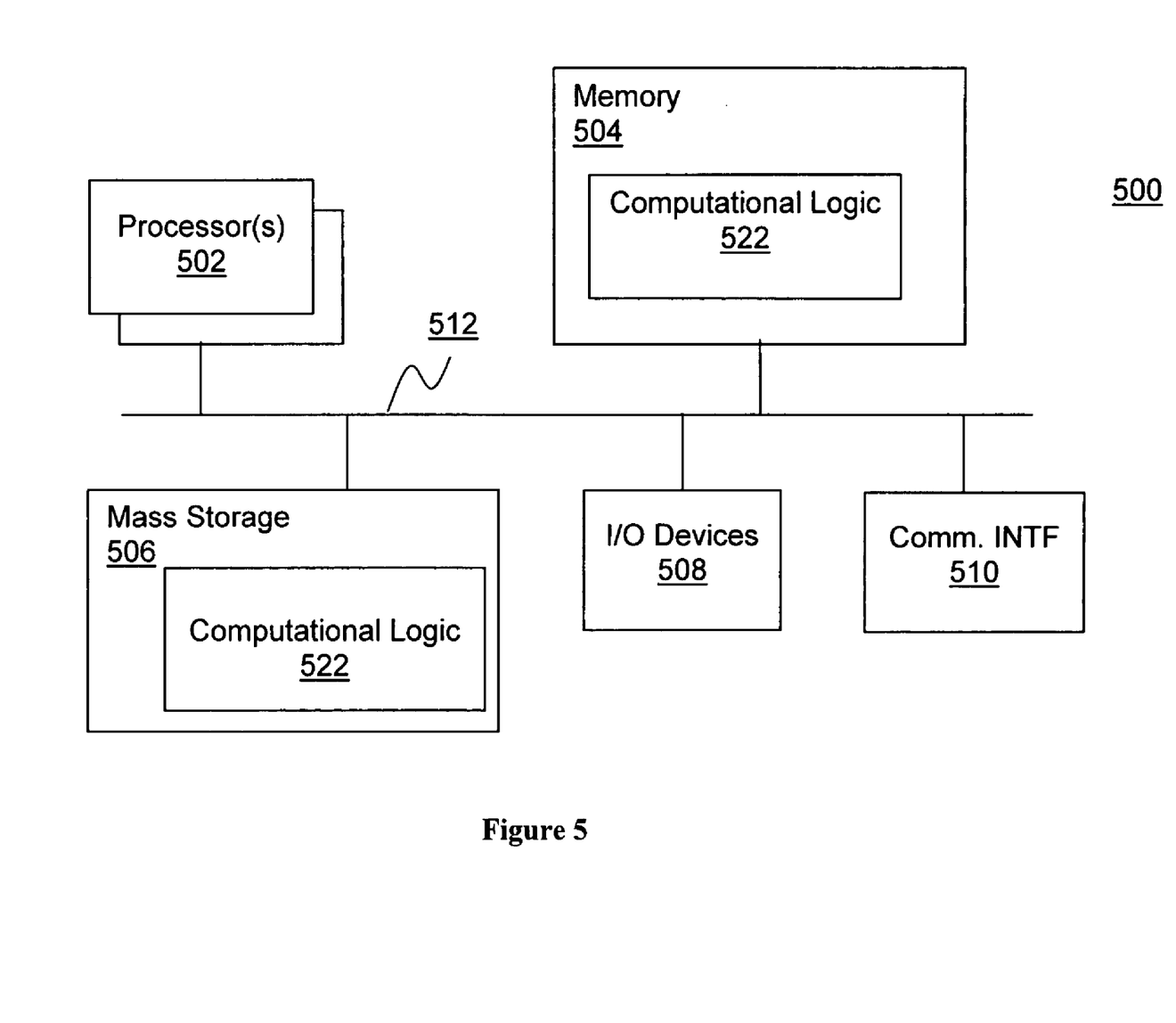
FIG. 5 illustrates an example computing device suitable for use to practice the present invention, in accordance with various embodiments.

In some embodiments, server 106 may be any sort of computer system known in the art equipped with an embodiment of collaborative tool 107 of the present invention. An exemplary computer system capable of performing the operations of server 106 is illustrated by FIG. 5.

Server 106 may also be connected via a networking fabric (not shown) to a database server (not shown) storing database 116 and to the same or another database server storing system design database 118. Such a networking fabric may be of any sort known in the art, such as the networks mentioned above, and may be the same networking fabric as the networking fabric mentioned above. The database server(s) may also be any sort of computer system known in the art, such as the computer systems mentioned above. In other embodiments, database 116 and/or system design database 118 may be stored locally on server 106, removing the need for database server(s).

The database 116 may, in various embodiments, be a relational database comprised of a plurality of tables capable of storing malfunctions 110 and effects 112/114 in a relational fashion. Such relational databases are well known in the art. In yet other embodiments, server 106 may not be connected to or have a database 116, but may instead store malfunctions 110, effects 112/114, and their relationships in a file.

In some embodiments, system design database 118 may also be a relational database comprised of a plurality of tables capable of storing airplane design schematics. In yet other embodiments, server 106 may not be connected to or have a system design database 118, but may instead store airplane design schematics in a file.

In one embodiment, client 102, server 106, database 116, and system design database 118 may all reside on the same computer system, for example, in a plurality of virtual machines of the computer system.

As is shown, server 106 may receive malfunction and failure cases 110 from users of clients 102. The malfunctions 110 defined and entered by users of clients 102 may be, in some embodiments, any sort of airplane level system failure or malfunction. For example, users may enter the malfunction 110 of an airplane electrical bus or an airplane navigational system. In various embodiments, each of the entered malfunctions 110 may affect one or more other systems of the airplane. Further, users may also enter a probability and a hazard level for each malfunction 110, the probability indicating the chance of the malfunction 110 occurring in flight, and the hazard level indicating the effect of the malfunction 110 on airplane occupants and operations. The users tasked with entering and defining malfunction cases 110, probabilities, and hazard levels may be organized into design groups of airplane integration, safety, system analysts, and regulatory authorities. In one embodiment, each group may focus on a particular system or set of systems which fall within the expertise of members of the groups. In other embodiments, a single user may enter and define some or all of the malfunctions 110 via the client 102. Server 106 may receive the defined malfunctions 110 in a batch, at predetermined update times, or in real time as the malfunctions 110 are defined and entered by users into client 102.

In various embodiments, the users of clients 102 may be assigned permission levels, and only users of a certain permission level may enter malfunction cases 110. The collaborative tool 107, or a separate process of server 106, may determine if a user of client 102 has logged on with an appropriate permission level before accepting the malfunction cases 110 from client 102. In some embodiments, where the tool 107 is a web application and the client 102 includes a web browser, the tool 107 may first provide client 102 with a login/authentication web page, of the sort often used in the art, and may provide the client 102 with a web page allowing the entry of malfunction cases 110 only when the tool 107 has ascertained that the user of client 102 has the proper permission level.

In some embodiments, any scheme of permission levels known in the art may be used. For example, the tool 107 may define roles of "ReadOnlyUser," "ReadWriteUser," "SystemFocal," and "Admin." A "ReadOnlyUser" may only view the malfunctions 110, effects 112/114, and their relationships, but may not enter or modify them. A "ReadWriteUser" has the privileges of a "ReadOnlyUser" and may also enter direct effects 112 and indirect effects 114 of certain malfunctions 110, and may also enter associated flight deck messages and compensatory flight crew/pilot actions that may be taken in the event the malfunction occurs. The user may then only modify and/or delete the data that he or she has entered. A "SystemFocal" user has the privileges of a "ReadWriteUser," and may also enter, update, and delete malfunction cases 110 for one or more systems. An "Admin" user may have complete permissions to view, enter, update, and delete malfunctions 110, effects 112/114, and associated data.

In alternate embodiments, malfunction cases 110 may be received directly by the server 106 from the malfunctioning system 104. The system 104 may be equipped with a sensor or embedded system capable of transmitting a signal in the event of a system 104 malfunctions or fails. Upon sensing a malfunction 110, the sensor or embedded system may immediately alert the server 106, in real time. The signal sent may be of any sort known in the art, such as a radio frequency (RF) signal or a light signal. Such sensors, embedded devices, and signals are well known in the art, and need not be described further.

As illustrated, server 106 may also receive direct effects 112 and indirect effects 114 of malfunction cases 110 from clients 102, entered by users of clients 102. A direct effect 112 may be any primary effect resulting directly from a system malfunction 110. An indirect effect 114 may be any secondary, tertiary, and so on, effect resulting indirectly from a system malfunction 110 and directly from a direct effect 112 or from another indirect effect 114. Thus, users may enter effects 112/114 and their propagation, indicating for each entered effect 112/114 which malfunction 110, direct effect 112, or indirect effect 114 the newly entered effect 112/114 may result from. For example, the electric bus malfunction 110 mentioned above may have a number of direct effects 112, such as hydraulic effects, navigational effects, and avionics effects. The hydraulic effect may be associated with an indirect effect 114, such as a flight control effect, and the indirect flight control effect 114 may be associated with a further indirect effect 114, such as an air frame vibration effect. In some embodiments, an effect 112/114 may be associated with a combination of malfunction cases 110, other effects 112/114, or combinations of both, only occurring when the combination occurs. Thus, for example, a certain direct effect 112 may occur only when two malfunctions 110 occur, or a certain indirect effect 114 may occur only when two direct effects 112 and/or indirect effects 114 occur. Further, in various embodiments, when a direct effect 112 has been entered for one malfunction 110, and is then entered again for a second malfunction 110, the tool 107 may map the indirect effect(s) 114 associated with that direct affect 112 to the second entry of the direct effect 112, removing the need to reenter the same data.

In some embodiments, the effects 112/114 are entered by the same groups of users that have entered the malfunction cases 110. In other embodiments, the effects 112/114 are entered by additional teams of system analysts. As mentioned above, only users with a certain permission level may enter the various effects 112/114. For example, tool 107 may require that a user be a "ReadWriteUser," a "SystemFocal" user, or an "Admin" user to enter effects 112/114 of malfunctions 110. In some embodiments, the malfunctions 110, direct effects 112, and indirect effects 114 are entered in iterative cycles, with the tool 107 notifying users through clients 102 or through email when a new malfunction 110 or effect 112/114 has been entered, necessitating the users' review and the entry of additional levels of direct effects 112 and indirect effects 114. Further, in addition to entering direct effects 112 and indirect effects 114, users may also enter flight deck messages and compensatory pilot/flight crew actions associated with a malfunction case 110, and occurrence probabilities and hazard levels for each effect, similar to the probabilities and hazard levels described above in reference to malfunction cases.

In an alternate embodiment, the server 106 may receive signals indicating malfunctions 110 from system 104, rather than or in addition to receiving malfunction cases 110 and effects 112/114 entered by users. The systems 104 experiencing a malfunction 110 or an effect 112/114 of a malfunction 110 (manifesting itself as a secondary or tertiary malfunction) may alert server 106 of the malfunctions 110 in the manner described above. The tool 107 of server 106 may then deduce which received signals indicate malfunctions 110, which indicate direct effects 112, and which indicate indirect effects 114 either from the time of signal arrival or from a predetermined airplane schematic indicating system relationships. Such a schematic may be stored in the above described system design database 118. In one embodiment, the client 102 may use collaborative tool 107 to view the malfunction 110 and effects 112/114 received from the systems and may use the airplane schematic to determine effects relationships. Each system 104 may have a unique signal, thus allowing the tool 107 to determine the system 104 experiencing the malfunction 110 or effect 112/114.

Referring again to FIG. 1, the collaborative tool 107 of server 106 may store the received malfunction cases 110, effects 112/114, and other additional information (comprising system malfunction effects data) in a database 116, in some embodiments. Database 116 may be any sort of database known in the art, including a relational database possessing a plurality of tables connected by data relationships. Each malfunction 110 and effect 112/114 may be stored in a table, with the relationships between the tables corresponding to the relationships between the malfunctions 110, direct effects 112, and indirect effects 114. Flight deck messages and compensatory actions of the kind described above may be stored in their own tables or may be stored as fields of malfunction or effect tables for the malfunction 110 or effect 112/114 to which the messages and actions are related. Additionally, the above tables may include fields for probabilities and hazard levels. In alternate embodiments, tool 107 may store the system malfunction effects data 108 in structures of a file rather than in database 116.

As shown, once collaborative tool 107 of server 106 has received and stored the system malfunction effects data 108, the tool 107 may facilitate users in viewing and/or modifying the data 108 through clients 102. A user requesting to view one or more malfunctions 110 and their direct effects 112 and indirect effects 114, may have the content 108 comprising the requested malfunctions 110 and effects 112/114 presented in a relational fashion, illustrating the associations between each malfunction 110 and its one or more direct effects 112, between each direct effect 112 and its possible one or more indirect effects 114, and in some embodiments, between each indirect effect 114 and its further one or more indirect effects 114. The content 108 may be presented in a graphic tree structure on a web page created by tool 107, and the web page illustrating content 108 may be sent to client 102, and displayed on the client 102 to the user. Thus, the user may view a graphic web page displaying malfunctions 110 and their associated effects 112/114, with the effect propagation illustrated by a tree structure or some similar graphic representation. In other embodiments, displayed content 108 may also include flight deck messages and compensatory actions, and may include the messages and actions as part of the web page graphic display generated by tool 107. In yet other embodiments, the web page provided to client 102 may be and interactive web page, facilitating a user in viewing probabilities and hazard levels associated with a malfunction 110 or effect 112/114 by returning an additional web page displaying such content in response to a user click on a malfunction 110 or effect 112/114 on the interactive webpage created by tool 107. In addition to the above described design groups, pilots and other airline personnel may also view the system malfunction effects data 108. Such users might be assigned a permission level of "ReadOnlyUser."

In various embodiments, the web page generated by tool 107 may also facilitate a user in modifying malfunctions 110, effects 112/114, or associated data. The ability of a user to modify or delete any portion of the data 108 may be controlled by a permission level of the user, as discussed above, with some users only able to edit or delete effects 112/114 of a certain malfunction 110, some users able to do that, and in addition edit and delete certain malfunctions 110, and some users able to edit and delete any portion of the system malfunction effects data 108. Such modifications may be achieved by providing users with interactive web page elements for those elements the user is able to modify. For example, a web page for a certain user might have interactive effect 112/114 boxes displayed as part of the web page. The user might either be able to change information displayed in the boxes or delete the boxes. Such interactivity may be achieved by client and/or server side scripting. This sort of scripting is well known in the art, and need not be described further. Additionally, if a user deletes an effect 112/114, any indirect effects 114 associated only with that effect 112/114 may also be automatically deleted. The user's manipulations of the displayed data may be communicated back to server 106 by client 102, and stored by tool 107.

Further, in some embodiments, collaborative tool 107 may recommend design changes to an airplane design. Design change recommendations might be triggered by the result of a hazard level or levels of one or more malfunctions 110 and/or effects 112/114 multiplied by the probabilities of the malfunctions/effects 110/112/114 exceeding a certain threshold. For example, hazard levels might be numerically represented, with a "one" indicating the lowest hazard level and a "five" indicating the highest. A threshold metric triggering a design change recommendation might be "three." Thus, any malfunction 110 or effect 112/114 having a hazard level of "five" and a probability of sixty percent or more would trigger a design change recommendation. A design change recommendation might be triggered by a more complex formula as well, such as one measuring the number of levels of indirect effects 114 and/or considering the probabilities of occurrence of the effects 112/114 in the case of a malfunction 110. Such a recommendation might result in a "halt" message being sent to personnel and/or systems responsible for an airplane system supply chain. Alert emails notifying users of the design change recommendation may also be sent to the design group or groups associated with the malfunction(s) 110 and/or effect(s) 112/114 triggering the recommendation.

In some embodiments, the collaborative tool 107 of server 106 may also generate reports capable of use in an airplane design certification process. Tool 107 may provide a web page to a user of a client 102 that allows a client to select among and/or enter a number of parameters to customize the report generated by the tool 107.

Figure 2:
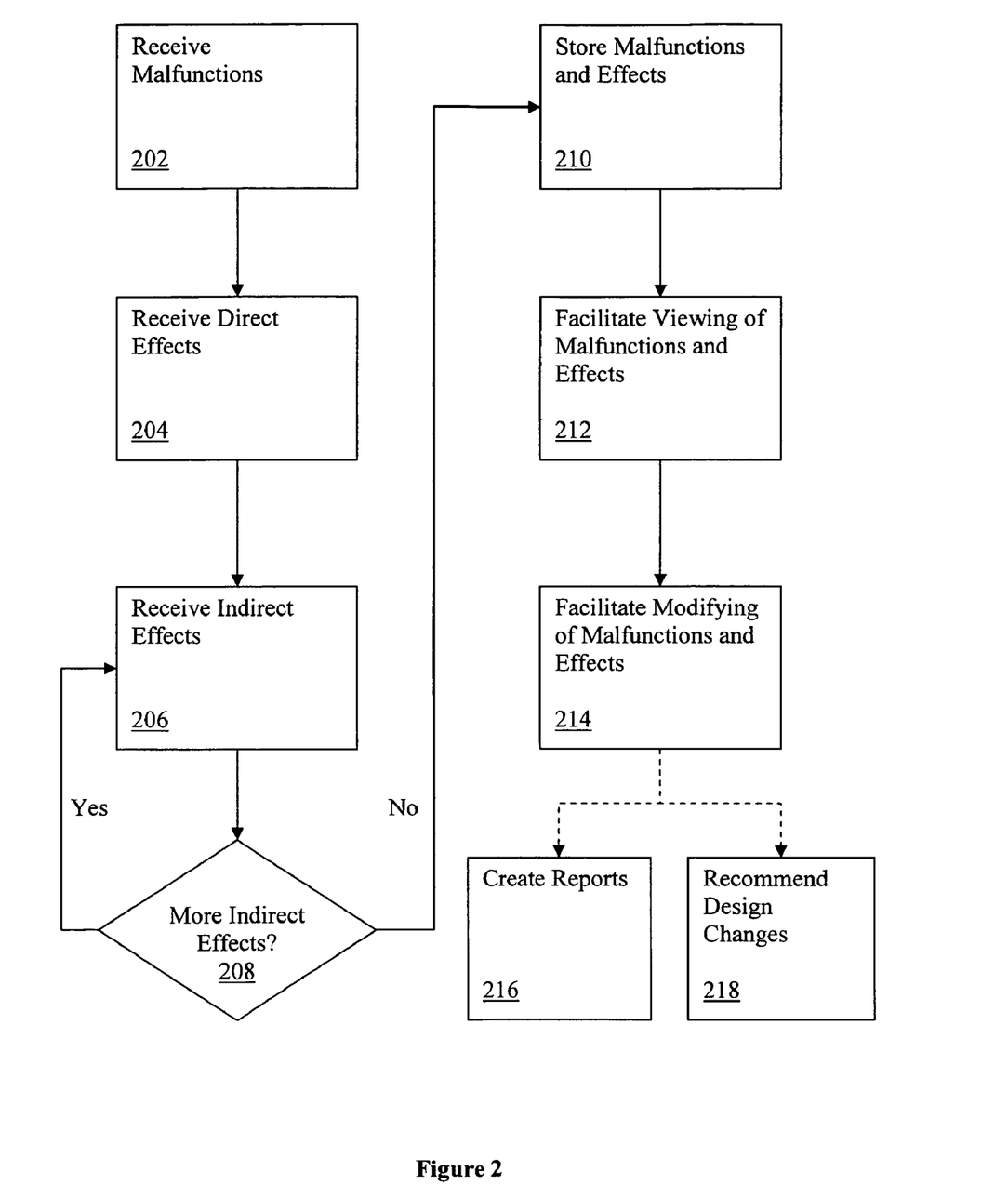
FIG. 2 illustrates a flowchart view of selected operations of the present invention, in accordance with various embodiments.

FIG. 2 illustrates a flowchart view of selected operations of the present invention, in accordance with various embodiments. As is shown, a server may receive malfunction and failure cases from users of clients, block 202. The malfunctions defined and entered by users of clients may be, in some embodiments, any sort of airplane level system failure or malfunction. For example, users may enter the malfunction of an airplane electrical bus or an airplane navigational system. In various embodiments, each of the entered malfunctions may affect one or more other systems of the airplane. Further, users may also enter a probability and a hazard level for each malfunction, the probability indicating the chance of the malfunction occurring in flight, and the hazard level indicating the effect of the malfunction on airplane occupants and operations. The users tasked with entering and defining malfunction cases, probabilities, and hazard levels may be organized into design groups of airplane integration, safety, system analysts, and regulatory authorities. In one embodiment, each group may focus on a particular system or set of systems which fall within the expertise of members of the groups. In other embodiments, a single user may enter and define some or all of the malfunctions via the client. The server may receive the defined malfunctions in a batch, at predetermined update times, or in real time as the malfunctions are defined and entered by users into the client.

In various embodiments, the users of clients may be assigned permission levels, and only users of a certain permission level may enter malfunction cases, block 202. The collaborative tool, or a separate process of the server, may determine if a user of a client has logged on with an appropriate permission level before accepting the malfunction cases from the client. In some embodiments, where the tool is a web application and the client is a web browser, the tool may first provide the client with a login/authentication web page, of the sort often used in the art, and may then provide the client with a web page allowing the entry of malfunction cases only when the tool has ascertained that the user of the client has the proper permission level.

In some embodiments, any scheme of permission levels known in the art may be used. For example, the tool may define roles of "ReadOnlyUser," "ReadWriteUser," "SystemFocal," and "Admin." A "ReadOnlyUser" may only view the malfunctions, effects, and their relationships, but may not enter or modify them. A "ReadWriteUser" has the privileges of a "ReadOnlyUser" and may also enter direct and indirect effects of certain malfunctions, and may also enter associated flight deck messages and compensatory flight crew/pilot actions that may be taken in the event the malfunction occurs. The user may then only modify and/or delete the data that he or she has entered. A "SystemFocal" user has the privileges of a "ReadWriteUser," and may also enter, update, and delete malfunction cases for one or more systems. An "Admin" user may have complete permissions to view, enter, update, and delete malfunctions, effects, and associated data.

In alternate embodiments, malfunction cases may be received directly by the server from the malfunctioning system, block 202. The system may be equipped with a sensor or embedded system capable of transmitting a signal in the event of a system malfunctions or fails. Upon sensing a malfunction, the sensor or embedded system may immediately alert the server, in real time. The signal sent may be of any sort known in the art, such as a radio frequency (RF) signal or a light signal. Such sensors, embedded devices, and signals are well known in the art, and need not be described further.

As illustrated, the server may also receive direct effects, block 204, and indirect effects, block 206, of malfunction cases from clients, entered by users of clients. A direct effect may be any primary effect resulting directly from a system malfunction. An indirect effect may be any secondary, tertiary, and so on, effect resulting indirectly from a system malfunction and directly from a direct effect or from another indirect effect. Thus, users may enter effects and their propagation, indicating for each entered effect which malfunction, direct effect, or indirect effect the newly entered effect may result from. For example, the electric bus malfunction mentioned above may have a number of direct effects, such as hydraulic effects, navigational effects, and avionics effects. The hydraulic effect may be associated with an indirect effect, such as a flight control effect, and the indirect flight control effect may be associated with a further indirect effect, such as an air frame vibration effect. In some embodiments, an effect may be associated with a combination of malfunction cases, other effects, or combinations of both, only occurring when the combination occurs. Thus, for example, a certain direct effect may occur only when two malfunctions occur, or a certain indirect effect may occur only when two direct effects and/or indirect effects occur. Further, in various embodiments, when a direct effect has been entered for one malfunction, and is then entered again for a second malfunction, the tool may map the indirect effect(s) associated with that direct affect to the second entry of the direct effect, removing the need to reenter the same data.

In some embodiments, the effects are entered by the same groups of users that have entered the malfunction cases. In other embodiments, the effects are entered by additional teams of system analysts. As mentioned above, only users with a certain permission level may enter the various effects. For example, the tool may require that a user be a "ReadWriteUser," a "SystemFocal" user, or an "Admin" user to enter effects of malfunctions. In some embodiments, the malfunctions, direct effects, and indirect effects are entered in iterative cycles, with the tool notifying users through clients or through email when a new malfunction or effect has been entered, necessitating the users' review and the entry of additional levels of direct and indirect effects. Thus, after entering one level on indirect effects associated with direct effects, a user may be prompted by the collaborative tool method to enter another level of indirect effects, block 208, and the user may or may not elect to enter the additional level of indirect effects. Further, in addition to entering direct and indirect effects, users may also enter flight deck messages and compensatory pilot/flight crew actions associated with a malfunction case, and occurrence probabilities and hazard levels for each effect, similar to the probabilities and hazard levels described above in reference to malfunction cases.

In an alternate embodiment, the server may only receive signals indicating malfunctions from system, rather than receiving malfunction cases and effects entered by users. The systems experiencing a malfunction or an effect of a malfunction (manifesting itself as a secondary or tertiary malfunction) may alert the server of the malfunctions in the manner described above. The tool of the server may then deduce which received signals indicate malfunctions, which indicate direct effects, and which indicate indirect effects either from the time of signal arrival or from a pre-determined airplane schematic indicating system relationships. In some embodiments, such airplane design schematics may be stored in a system design database that may be accessible by the server. In such embodiments, each system may have a unique signal, thus allowing the tool to determine the system experiencing the malfunction or effect.

Referring again to FIG. 2, the collaborative tool method may store the received malfunction cases, effects, and other additional information (comprising system malfunction effects data) in a database, block 210. The database may be any sort of database known in the art, including a relational database possessing a plurality of tables connected by data relationships. Each malfunction and effect may be stored in a table, with the relationships between the tables corresponding to the relationships between the malfunctions, direct effects, and indirect effects. Flight deck messages and compensatory actions of the kind described above may be stored in their own tables or may be stored as fields of malfunction or effect tables for the malfunction or effect to which the messages and actions are related. Additionally, the above tables may include fields for probabilities and hazard levels. In alternate embodiments, the tool may store the system malfunction effects data in structures of a file rather than in the database.

As shown, once the collaborative tool method has received and stored the system malfunction effects data, the method may facilitate users in viewing the data through the clients, block 212. A user requesting to view one or more malfunctions and their direct and indirect effects, may have the content comprising the requested malfunctions and effects presented in a relational fashion, illustrating the associations between each malfunction and its one or more direct effects, between each direct effect and its possible one or more indirect effects, and in some embodiments, between each indirect effect and its further one or more indirect effects. The content may be presented in a graphic tree structure on a web page created by the tool, and the web page illustrating content may be sent to the client, and displayed on the client to the user. Thus, the user may view a graphic web page displaying malfunctions and their associated effects, with the effect propagation illustrated by a tree structure or some similar graphic representation. In other embodiments, displayed content may also include flight deck messages and compensatory actions, and may include the messages and actions as part of the web page graphic display generated by the tool. In yet other embodiments, the web page provided to the client may be and interactive web page, facilitating a user in viewing probabilities and hazard levels associated with a malfunction or effect by returning an additional web page displaying such content in response to a user click on a malfunction or effect on the interactive webpage created by the tool. In addition to the above described design groups, pilots and other airline personnel may also view the system malfunction effects data. Such users might be assigned a permission level of "ReadOnlyUser."

In various embodiments, the web page generated by the collaborative tool method may also facilitate a user in modifying malfunctions, effects, or associated data, block 214. The ability of a user to modify or delete any portion of the data may be controlled by a permission level of the user, as discussed above, with some users only able to edit or delete effects of a certain malfunction, some users able to do that, and in addition edit and delete certain malfunctions, and some users able to edit and delete any portion of the system malfunction effects data. Such modifications may be achieved by providing users with interactive web page elements for those elements the user is able to modify. For example, a web page for a certain user might have interactive effect boxes displayed as part of the web page. The user might either be able to change information displayed in the boxes or delete the boxes. Such interactivity may be achieved by client and/or server side scripting. This sort of scripting is well known in the art, and need not be described further. Additionally, if a user deletes an effect, any indirect effects associated only with that effect may also be automatically deleted. The user's manipulations of the displayed data may be communicated back to the server by the client, and stored by the tool.

In some embodiments, the collaborative tool method may also generate reports capable of use in an airplane design certification process, block 216. The tool may provide a web page to a user of a client that allows a client to select among and/or enter a number of parameters to customize the report generated by the tool.

Further, in some embodiments, the collaborative tool method may recommend changes to an airplane design, block 218. Design change recommendations might be triggered by the result of a hazard level or levels of one or more malfunctions and/or effects multiplied by the probabilities of the malfunctions/effects exceeding a certain threshold. For example, hazard levels might be numerically represented, with a "one" indicating the lowest hazard level and a "five" indicating the highest. A threshold metric triggering a design change recommendation might be "three." Thus, any malfunction or effect having a hazard level of "five" and a probability of sixty percent or more would trigger a design change recommendation. A design change recommendation might be triggered by a more complex formula as well, such as one measuring the number of levels of indirect effects and/or considering the probabilities of occurrence of the effects in the case of a malfunction. Such a recommendation might result in a "halt" message being sent to personnel and/or systems responsible for an airplane system supply chain. Alert emails notifying users of the design change recommendation may also be sent to the design group or groups associated with the malfunction(s) and/or effect(s) triggering the recommendation.

Figure 3:
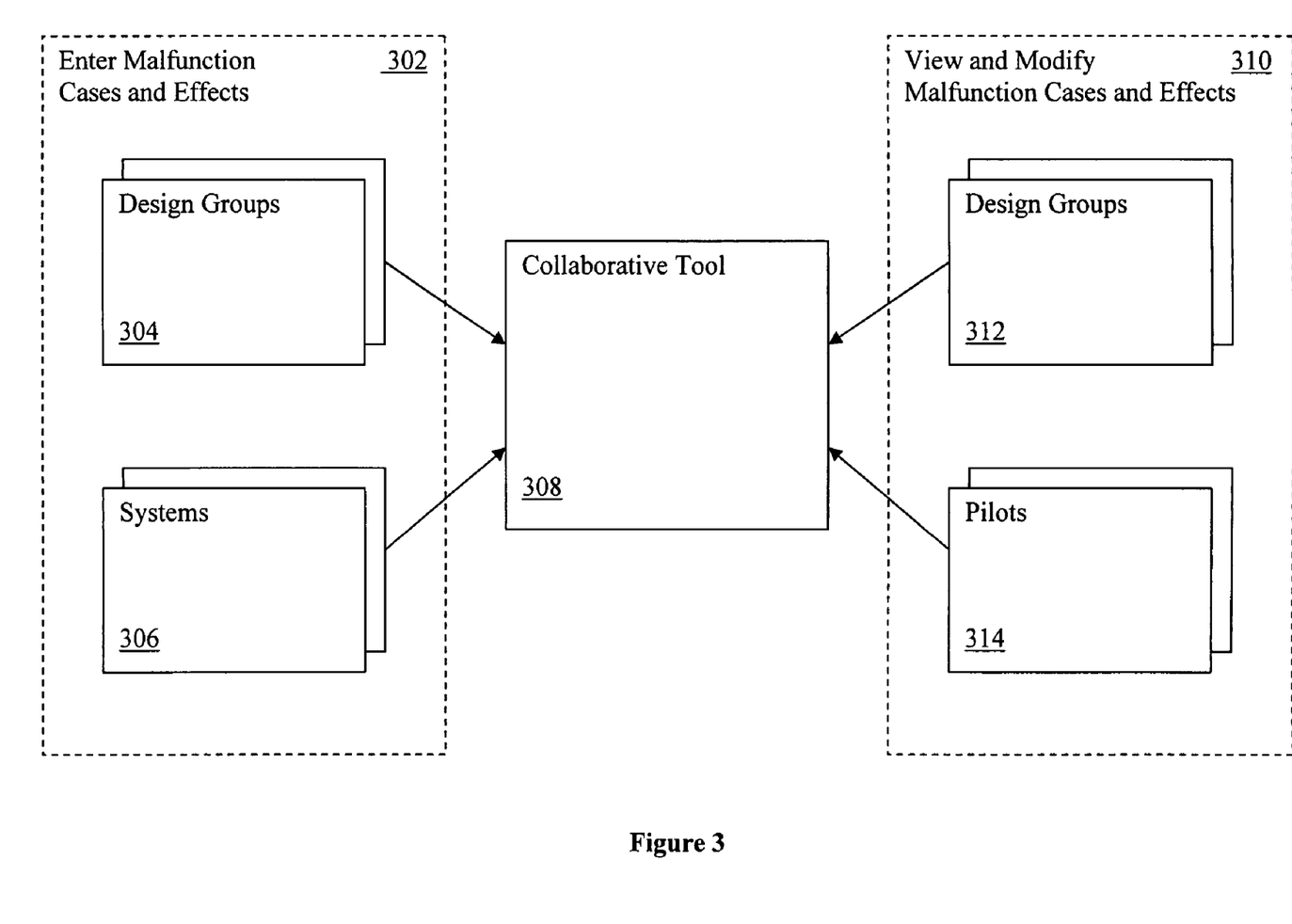
FIG. 3 illustrates a collaborative, roles-based aspect of the present invention, in accordance with various embodiments.

FIG. 3 illustrates a collaborative, roles-based aspect of the present invention, in accordance with various embodiments. As described above in reference to FIGS. 1 and 2, a plurality of design groups 304 may be involved in entering malfunction cases and effects, block 302, which in turn may be received by a collaborative tool 308. In some embodiments, each design group 304 may have a particular area of expertise, and may enter malfunctions and effects associated with that area of expertise. In alternate embodiments, sensors or embedded systems of systems 306 may automatically transmit signals to tool 308 in the event that a system 306 malfunctions. The processes for entering and receiving malfunctions and effects are described in greater detail above.

As is also shown, a plurality of design groups 312 may be involved in viewing and modifying the malfunction cases and effects, block 310. In some embodiments, design groups 312 may be the same as design groups 304. Again, each design group 312 may have a particular area of expertise, and may view and modify malfunctions and effects associated with that area of expertise. Additionally, pilots 314 and other airline personnel may also view malfunctions, effects, and other associated data, such as the above described compensatory actions. The processes for viewing and modifying malfunctions and effects are described in greater detail above.

Figure 4:
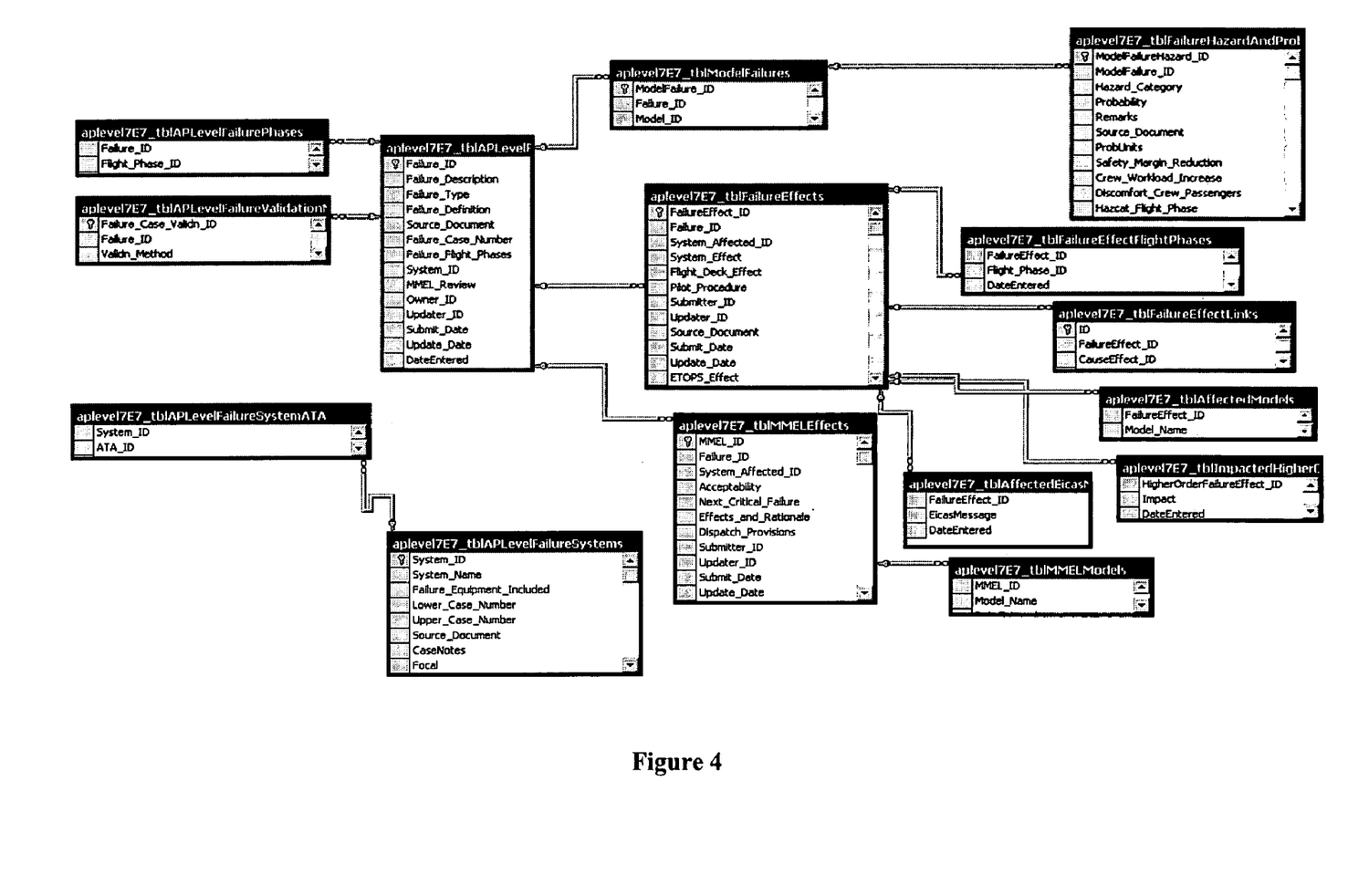
FIG. 4 illustrates an exemplary relational database schema of the present invention, including a plurality of malfunction and effects tables, in accordance with various embodiments.

FIG. 4 illustrates an exemplary relational database schema of the present invention, including a plurality of malfunction and effects tables, in accordance with various embodiments. As described above in reference to FIGS. 1 and 2, the tables may store malfunction and effect data, with the associations between the tables corresponding to the associations between the malfunctions, the direct effects, and the indirect effects. Tables may also store flight deck messages and compensatory actions for flight crews/pilots in the event a malfunction occurs. In other embodiments, however, the messages and actions may be stored as fields of the table storing the malfunction/effect the message/action is associated with. Further, fields of the tables may also store occurrence probabilities and/or hazard levels for each malfunction/effect.

FIG. 5 illustrates an example computing device suitable for use to practice the present invention, in accordance with various embodiments. As shown, computing device 500 includes one or more processors 502, and system memory 504. Additionally, computing device 500 includes mass storage devices 506 (such as diskette, hard drive, CDROM and so forth), input/output devices 508 (such as keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing an embodiment of the present invention or selected aspects, here shown as computational logic 522. The programming instructions may be implemented as assembler instructions supported by processor(s) 502 or high level languages, such as C, that can be compiled into such instructions.

The permanent copy of the programming instructions may be placed into permanent storage 506 in the factory, or in the field, through e.g. a distribution medium (not shown) or through communication interface 510 (from a distribution server (not shown)).

The constitution of these elements 502-512 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those with skill in the art will readily appreciate that the present invention may be implemented in a very wide variety of embodiments or extended there from. For example, in various embodiments, the system may also be extended to provide confidence metrics for the predictions. This application is intended to cover any adaptations or variations of the embodiments discussed herein. Therefore, it is manifestly intended that this invention be limited only by the claims and the equivalents thereof.

What is claimed is:

1. A method of collaborative failure analysis, the method comprising:
    receiving, into a tool, data from at least one first external source that comprises at least one airplane system malfunction case, the at least one airplane system malfunction case being predefined by the at least one first external source;
    receiving, into the tool, from a plurality of second external sources, a plurality of effects resulting from the received at least one airplane system malfunction case, the plurality of second external sources comprising a plurality of users; and
    generating a recommendation for a design change to an airplane design based on the received at least one airplane system malfunction case and the received plurality of effects resulting from the received at least one airplane system malfunction case.

2. The method of claim 1, wherein the received plurality of effects comprise:
    a direct effect that directly results from an airplane system malfunction case of the at least one airplane system malfunction case; and
    an indirect effect that indirectly results from the airplane system malfunction case of the at least one airplane system malfunction case and directly results from the direct effect or from another indirect effect.

3. The method of claim 2, wherein the at least one airplane system malfunction case comprises a plurality of airplane system malfunction cases, and wherein the direct effect directly results from a combination of the plurality of airplane system malfunction cases, the direct effect only occurring when the combination of the plurality of airplane system malfunction cases occurs, and wherein the indirect effect indirectly results from the combination of the plurality of the airplane system malfunction cases.

4. The method of claim 1, further comprising:
    receiving, into the tool, occurrence probabilities and hazard levels corresponding to the plurality of effects resulting from the received at least one airplane system malfunction case, wherein generating the recommendation for a design change is based on the hazard levels and the occurrence probabilities exceeding a threshold metric.

5. The method of claim 1, further comprising:
    generating a web page created by the tool to input the data and the plurality of effects.

6. The method of claim 5, wherein the inputting comprises:
    assigning a permission level to a request to access the received data; and
    enabling the entering of the received data to the generated web page based on the assigned permission level.

7. The method of claim 5, further comprising:
    generating a report on the received data that enables an airplane design certification process, the report being customized by selecting in the web page a number of parameters.

8. The method of claim 1, wherein the at least one first external source comprises at least one user, and further comprising receiving, into the tool, data that comprises at least one airplane system malfunction case from an airplane system that experiences an airplane system malfunction.

9. The method of claim 1, wherein the plurality of users comprises a plurality of groups of aircraft personnel.

10. The method of claim 9, wherein each group of the plurality of groups has an expertise with respect to a particular aircraft system, and wherein each group of the plurality of groups enters into the tool at least one effect with respect to the particular aircraft system in which the group has the expertise.

11. An apparatus comprising:
a processor;
a memory storing programming instructions; and
a collaborative tool that relates airplane system malfunctions to effects resulting from the airplane system malfunctions, the collaborative tool executing the programming instructions to perform actions of:
receiving into the collaborative tool, data from at least one first external source that comprises at least one airplane system malfunction case, the at least one airplane system malfunction case being predefined by the at least one first external source;
receiving, into the collaborative tool, from a plurality of second external sources, a plurality of effects resulting from the received at least one airplane system malfunction case, the plurality of second external sources comprising a plurality of users; and
generating a recommendation for a design change to an airplane design based on the received at least one airplane system malfunction case and the received plurality of effects resulting from the received at least one airplane system malfunction case.

12. The apparatus of claim 11, wherein the collaborative tool is further operated by the processor to perform actions comprising:
generating a web page to input the received data and the plurality of effects;
assigning a permission level to a request to access the received data; and
enabling entering of the received data to the generated web page based on the assigned permission level.

13. The apparatus of claim 11, wherein the collaborative tool is further operated by the processor to store the received data, and the storing comprises storing the received data in a relational database, the relational database comprising a plurality of tables, wherein a relationship between each table in the plurality of tables corresponds to a relation between each of the at least one airplane system malfunction case and the plurality of effects resulting from each of the at least one airplane system malfunction case.

14. The apparatus of claim 11, wherein generating the recommendation for a design change is based on a hazard level and occurrence probabilities exceeding a threshold metric.

15. The apparatus of claim 11, wherein the collaborative tool is further operated by the processor to facilitate a viewing of the received data, the facilitating comprising:
accessing the received data based on an assigned permission level associated with a request.

16. The apparatus of claim 11, wherein the at least one airplane system malfunction case comprises a plurality of airplane system malfunction cases, and wherein the plurality of effects comprise:
a direct effect that directly results from a combination of the plurality of airplane system malfunction cases, the direct effect only occurring when the combination of the plurality of airplane system malfunction cases occurs; and
an indirect effect that indirectly results from the combination of the plurality of airplane system malfunction cases.

17. The apparatus of claim 11, wherein the collaborative tool is further operated by the processor to generate a report on the received data that enables an airplane design certification process, the report being customized by selecting in a web page a number of parameters.

18. The apparatus of claim 11, wherein the plurality of users comprises a plurality of groups of aircraft personnel.

19. The apparatus of claim 18, wherein each group of the plurality of groups has expertise with respect to a particular aircraft system, and wherein each group of the plurality of groups enters into the tool at least one effect with respect to the particular aircraft system in which the group has the expertise.

20. An article of manufacture comprising:
a storage medium; and
a plurality of programming instructions stored in the storage medium, the plurality of programming instructions adapted to program an apparatus to enable the apparatus to:
receive, into a tool, data from at least one first external source that comprises at least one airplane system malfunction case, the at least one airplane system malfunction case being predefined by the at least one external source;
receive, into the tool, from a plurality of second external sources, a plurality of effects resulting from the received at least one airplane system malfunction case, the plurality of second external sources comprising a plurality of users; and
generate a recommendation for a design change to an airplane design based on the received at least one airplane system malfunction case and the received plurality of effects resulting from the received at least one airplane system malfunction case.

21. The article of claim 20, wherein the plurality of programming instructions are further adapted to program the apparatus to enable the apparatus to generate a web page created by the tool to input the received data and the plurality of effects, wherein the inputting comprises:
assigning a permission level to a request to access the received data; and
enabling entering of the received data to the generated web page based on the assigned permission level.

22. The article of claim 20, wherein the plurality of programming instructions is further adapted to enable the apparatus to generate a report on the received data that enables an airplane design certification process, the report being customized by selecting in a web page a number of parameters.

23. The article of claim 20, wherein the plurality of users comprises a plurality of groups of aircraft personnel.

24. The article of claim 23, wherein each group of the plurality of groups has expertise with respect to a particular aircraft system, and wherein each group of the plurality of groups enters into the tool at least one effect with respect to the particular aircraft system in which the group has the expertise.

* * * * *